(12) United States Patent
Wang et al.

(10) Patent No.: US 11,861,040 B2
(45) Date of Patent: Jan. 2, 2024

(54) USER CONSENT FRAMEWORK

(71) Applicant: Google LLC, Mountain View, CA (US)

(72) Inventors: Gang Wang, Sunnyvale, CA (US); Yian Gao, Sunnyvale, CA (US)

(73) Assignee: Google LLC, Mountain View, CA (US)

(*) Notice: Subject to any disclaimer, the term of this patent is extended or adjusted under 35 U.S.C. 154(b) by 562 days.

(21) Appl. No.: 17/053,482

(22) PCT Filed: Jan. 22, 2020

(86) PCT No.: PCT/US2020/014530
§ 371 (c)(1),
(2) Date: Nov. 6, 2020

(87) PCT Pub. No.: WO2021/150213
PCT Pub. Date: Jul. 29, 2021

(65) Prior Publication Data
US 2022/0414255 A1    Dec. 29, 2022

(51) Int. Cl.
*G06F 21/62* (2013.01)
*G06F 21/60* (2013.01)

(52) U.S. Cl.
CPC ........ *G06F 21/6245* (2013.01); *G06F 21/602* (2013.01); *G06F 2221/2115* (2013.01)

(58) Field of Classification Search
CPC .............. G06F 21/6245; G06F 21/602; G06F 2221/2115
See application file for complete search history.

(56) References Cited

U.S. PATENT DOCUMENTS 6,959,420 B1 * 10/2005 Mitchell ............. G06F 21/6245
715/740
2013/0173642 A1 * 7/2013 Oliver .................... G06F 40/20
707/756

(Continued)

FOREIGN PATENT DOCUMENTS

JP    2001-005833    1/2001
JP    2002-055991    2/2002

(Continued)

OTHER PUBLICATIONS

NPL Search Terms (Year: 2023).*

(Continued)

*Primary Examiner* — Syed A Zaidi
(74) *Attorney, Agent, or Firm* — Fish & Richardson P.C.

(57) ABSTRACT

Methods, systems, and apparatus, including an apparatus for managing user data according to user consent settings are described. In some aspects, a method includes determining that a request for transmission by a client device to a recipient will include user data of a user of the client device. In response determining that the request will include the user data, the method includes requesting, from a consent management module of the client device, current user consent settings specified by the user which define at least one of (i) user data that can be transmitted from the client device, (ii) how user data transmitted from the client device can be used or (iii) which recipients can receive and retain user data from the client device. The method further includes receiving, from the consent management module, the current user consent settings and generating request data according the current user consent settings.

20 Claims, 5 Drawing Sheets

(56) References Cited

U.S. PATENT DOCUMENTS

| | | | | |
|---|---|---|---|---|
| 2014/0046591 A1* | 2/2014 | Boldyrev | ............ | H04L 12/1845 |
| | | | | 701/533 |
| 2016/0070758 A1* | 3/2016 | Thomson | ............... | G16H 10/60 |
| | | | | 707/781 |
| 2017/0295119 A1 | 10/2017 | Steinberg et al. | | |
| 2018/0101734 A1* | 4/2018 | Lemberger | ......... | H04N 21/4223 |
| 2019/0258781 A1 | 8/2019 | Qureshi et al. | | |
| 2020/0110904 A1* | 4/2020 | Shinde | ................ | G06F 21/6272 |
| 2020/0213254 A1* | 7/2020 | Nigam | ................... | G06Q 10/10 |

FOREIGN PATENT DOCUMENTS

| | | |
|---|---|---|
| JP | 2008-527526 | 7/2008 |
| JP | 2019-517086 | 6/2019 |
| WO | WO 2008029723 | 3/2008 |

OTHER PUBLICATIONS

Office Action in European Appln. No. 20708282.7, dated Feb. 8, 2023, 4 pages.

PCT International Search Report and Written Opinion in International Appln. No. PCT/US2020/014530, dated Jun. 26, 2020, 14 pages.

International Preliminary Report on Patentability in International Appln. No. PCT/US2020/014530, dated Aug. 4, 2022, 9 pages.

Office Action in Indian Appln. No. 202227032836, dated Sep. 21, 2022, 7 pages (with English translation).

Notice of Allowance in Japanese Appln. No. 2022-541854, dated Aug. 28, 2023, 4 pages (with English translation).

* cited by examiner

USER CONSENT FRAMEWORK

CROSS-REFERENCE TO RELATED APPLICATION

This application is a National Stage Application under 35 U.S.C. § 371 and claims the benefit of International Application No. PCT/US2020/014530, filed Jan. 22, 2020. The disclosure of the foregoing application is hereby incorporated by reference in its entirety.

BACKGROUND

User consent is an important part of online privacy protection. In some situations, users may want to ensure that their data is only collected and used according to their preferences. Honoring of user consent and protection of user data that is consented help gain user trust and improve users' online experience.

SUMMARY

This specification describes technologies relating to an end-to-end user consent framework that systematically collects, propagates, and enforces user consents across the online ecosystem.

In general, one innovative aspect of the subject matter described in this specification can be embodied in methods that include determining that a request for transmission by a client device to a recipient will include user data of a user of the client device. In response determining that the request will include the user data, the method includes requesting, from a consent management module of the client device, current user consent settings specified by the user which define at least one of (i) user data that can be transmitted from the client device, (ii) how user data transmitted from the client device can be used or (iii) which recipients can receive and retain user data from the client device. The method further includes receiving, from the consent management module, the current user consent settings and generating request data according the current user consent settings. Generating the request data involves including, in the request data, one or more portions of the user data of the user to which the user has consented to being transmitted to the recipient; and including, in the request data, at least a portion of the user consent settings that specify the consents given to the recipient of the one or more portions of the user data, wherein the consents restrict use of the one or more portions of the user data by the recipient. The method further involves transmitting the request data to the recipient. Other implementations of this aspect include corresponding apparatus, systems, and computer programs, configured to perform the aspects of the methods, encoded on computer storage devices. Another aspect includes a transitory computer-readable medium comprising instructions which, when executed by one or more processors, cause the processors to carry out the methods disclosed herein.

These and other implementations can each optionally include one or more of the following features.

Some aspects include generating, using a private key of computing platform of the client device, a digital signature of the portion of the user consent settings that specify the consents given to the recipient for using the one or more portions of the user data. Transmitting the request data to the recipient can include generating and transmitting an attestation token that includes at least the request data, user consent data, and the digital signature. Some aspects can include providing, to a third party, a public key that corresponds to the private key of the computing platform of the client device. The public key enables the third party to verify the user consent data. This enables a secure method for a third party to verify user consent data specified by a user.

Some aspects include receiving selection data specifying a selection, from multiple consent management platforms, of a given consent management platform. The method further comprises obtaining, from the given consent management platform or an application store, the consent management module, and installing, on the client device, the consent management module on the client device.

Some aspects include presenting an interactive interface that enables the user to specify the user consent settings and review current user consent settings. This aspect can include receiving data specifying the user consent settings and storing the user consent settings at the client device. This aspect can also include presenting, in the interactive interface, one or more recommended user consent settings. This aspect can also include selecting the one or more recommended user consent settings based at least on a current location of the client device or user activity on the client device. The user interface can enable a user to efficiently review and manage consent settings, thereby further facilitating improved control over a user's consent settings for their user data. Furthermore, presenting recommended user consent settings provides an efficient method for a user to specify their user consent settings without having to manually choose the settings, instead being able to adopt the recommended consent settings, which may be based on a current location of the client device or user activity on the client device.

Some aspects can include receiving a digital component for presentation at the client device and determining that the digital component is a personalized digital component selected based on one or more portions of user data of the user. In response to determining that the digital component is a personalized digital component selected based on one or more portions of user data of the user, the method includes determining whether the current user consent settings permit presentation of personalized digital components provided by a digital component distribution system that provided the personalized digital component, and in response to determining that the current user consent settings do not permit presentation of personalized digital components provided by a digital component distribution system, blocking presentation of the personalized digital component by the client device. In this way, the method uses the current user consent settings to prevents unwanted personalized digital components from being presented on the client device.

In some aspects, the consent management module includes a user-consent plug-in of a computing platform of the client device. In some aspects, the consent management module comprises a user consent plug-in of an operating system of the client device. In some aspects, the consent management module comprises a user consent plug-in of a web browser of the client device. Providing the consent management module by means of a plug-in in the manner of these embodiments allows the consent management module to be installed as a plug-in to pre-existing applications or systems on the client device, thereby providing the additional functionality provided by the consent management module to these pre-existing applications or systems.

The subject matter described in this specification can be implemented in particular embodiments so as to realize one or more of the following advantages. User consent platforms described in this document enable users to specify user consent settings for multiple recipients (e.g., domains) using a single consent management plug-in (or other module) and/or a single user interface, making control of how user data is collected and used easier and more efficient. In other words, the disclosed subject matter provides a means for a user to centrally manage user consent settings for their user data for multiple recipients, thereby providing users with improved control over their personal user data. The consent management plug-in can also recommend custom user consent settings for a user, e.g., based on a geographic location of the user, thereby further increasing the efficiency and ease of managing consent settings and ensuring the consent settings are appropriate based on the laws or rules of various countries or regions. A client device can query the user consent settings prior to transmitting user data to prevent the transmission of user data for which the user has not consented to transmission.

When user data is transmitted from a client device, the transmitted data can include digitally signed user consent settings that must be stored by the recipient. In this way, the user and the usage of the user data can be audited to ensure compliance, while preventing the recipients from fraudulently tampering with the received user consent settings.

Various features and advantages of the foregoing subject matter is described below with respect to the figures. Additional features and advantages are apparent from the subject matter described herein and the claims.

BRIEF DESCRIPTION OF THE DRAWINGS

Like reference numbers and designations in the various drawings indicate like elements.

DETAILED DESCRIPTION

Figure 1:
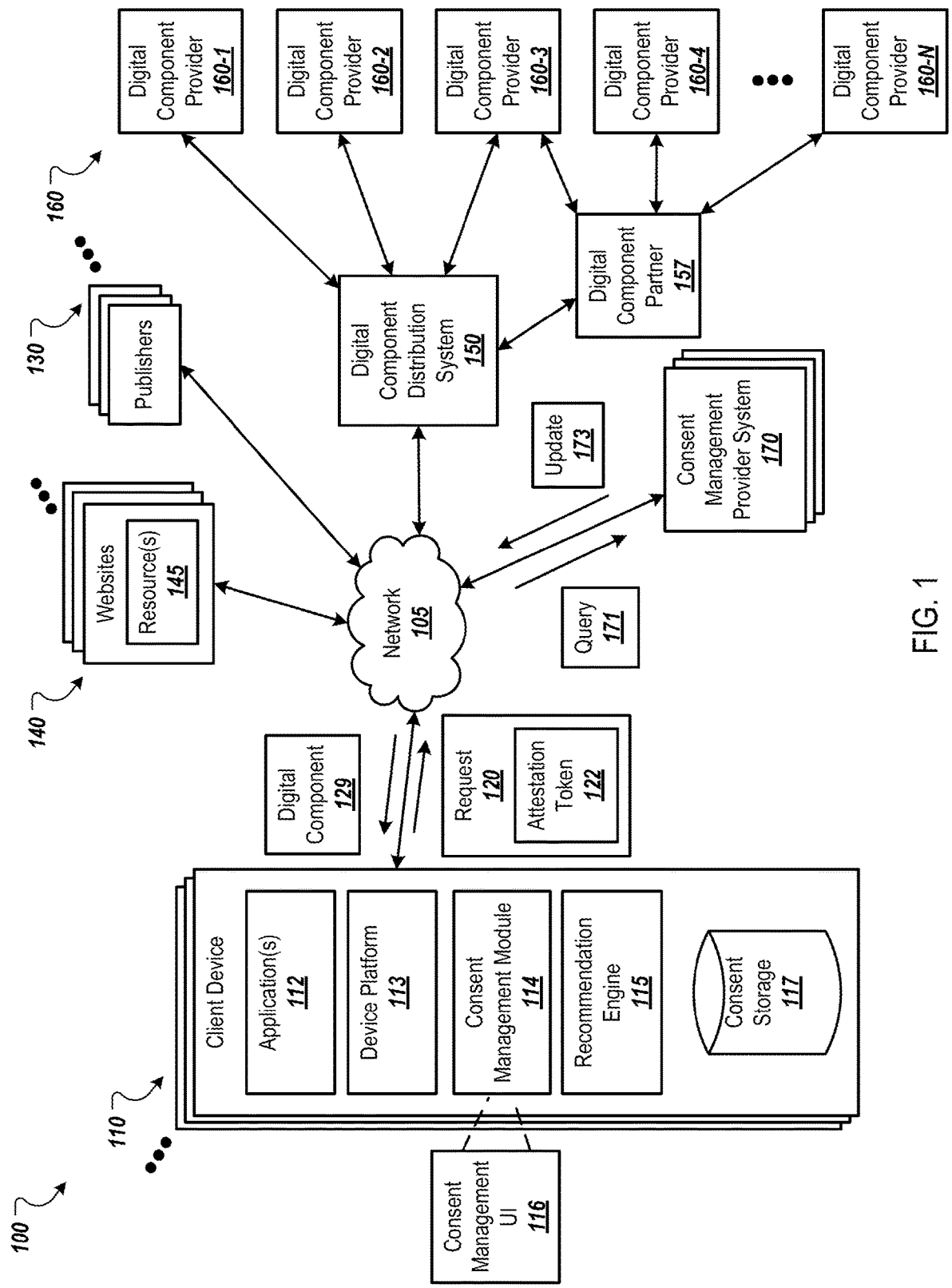
FIG. 1 is a block diagram of an environment that provides a framework for managing user consent to data collection and usage.

In general, systems and techniques described herein provide an end-to-end user consent framework that systematically collects, propagates, and enforces user consents across the online ecosystem (e.g., across completely separate domains). Many different companies and other organizations collect, share, and rely on user data for various purposes, such as customizing content for the users. One way to manage user consent is for each organization to obtain each of its users' consent, e.g., by requesting the user select preferences when they visit a website or download an application. However, this can be frustrating for the users, may require entry of duplicate data, and does not ensure that the user's data is being collected and/or used in accordance with those preferences. Accordingly, the disclosed subject matter is concerned with solving a technical problem of providing a simpler and more efficient approach to managing user consent data.

One or more technical solutions to this technical problem involve the disclosed user consent frameworks which may be implemented as systems, methods, apparatuses, computer-readable media and computer programs. The user consent frameworks described in this document enable users to select, from multiple consent management platforms, a consent management platform to manage their user consent settings. The user consent settings for a user define, for example, what user data can be collected, who can receive the data, and how the data can be used by each recipient. In this way, a user can centrally manage their privacy across the entire online ecosystem using a single platform. In other words, by using the consent management platform, the user can submit their consent settings once, and those settings can be enforced as the user accesses multiple different domains (e.g., websites) and applications (e.g., mobile apps) without requiring the user to re-submit their consent settings.

The consent management platforms can provide a consent management module, e.g., a plug-in for an operation system, to the client device of a user, which enables the user to specify the user consent settings. The consent management module can provide one or more interactive user interfaces that enable the user to specify the user consent settings. When the client device is going to transmit a request that will include user data, the platform of the client device can query the current user consent settings to determine what, if any, user data can be included in the request and what limitations on the data should be included in the request. The client device can then generate the request according to the current user consent settings and transmit the request to its recipient.

To ensure compliance with the user consent settings, requests sent from the client device can include digitally signed user consent settings that the recipient can store. In this way, an auditor can verify the user consent settings received by the recipient without the recipient being able to alter or falsify user consent settings.

The consent management module can also recommend, to a user, user consent settings to make it easier for a user to specify the user consent settings. The consent management module can recommend user consent settings based on a variety of factors, including, for example, a current geographic location of the user's device, the contribution of recipients to digital components presented at the user's device, and/or user activity on the device.

FIG. 1 is a block diagram of an environment 100 that provides a framework for managing user consent to data collection and usage. The example environment 100 includes a data communication network 105, such as a local area network (LAN), a wide area network (WAN), the Internet, a mobile network, or a combination thereof. The network 105 connects client devices 110, publishers 130, websites 140, a digital component distribution system 150, and consent management provider systems 170. The example environment 100 may include many different client devices 110, publishers 130, websites 140, and consent management provider systems 170.

A website 140 is one or more resources 145 associated with a domain name and hosted by one or more servers. An example website is a collection of web pages formatted in HTML that can contain text, images, multimedia content, and programming elements, such as scripts. Each website 140 is maintained by a publisher 130, which is an entity that controls, manages and/or owns one or more websites, including the website 140. A domain can be a domain host, which can be a computer, e.g., a remote server, hosting a corresponding domain name.

A resource 145 is any data that can be provided over the network 105. A resource 145 is identified by a resource address, e.g., a Universal Resource Locator (URL), that is associated with the resource 145. Resources include HTML pages, word processing documents, and portable document format (PDF) documents, images, video, and feed sources, to name only a few. The resources can include content, such as words, phrases, images and sounds, that may include embedded information (such as meta-information in hyperlinks) and/or embedded instructions (such as scripts).

A client device 110 is an electronic device that is capable of communicating over the network 105. Example client devices 110 include personal computers, mobile communication devices, e.g., smart phones, and other devices that can send and receive data over the network 105. A client device 110 has a device platform 113, which is an environment in which software applications execute. The device platform 113 can include the hardware of the client device 110 and/or the operation system of the client device 110.

A client device 110 typically includes applications 112, such as web browsers and/or native applications, that run in the device platform 113 and that facilitate the sending and receiving of data over the network 105. A native application is an application developed for a particular platform or a particular device. Publishers 130 can develop and provide, e.g., make available for download, native applications to the client devices 110. In some implementations, the client device 110 is a digital media device, e.g., a streaming device that plugs into a television or other display to stream videos to the television. The digital media device can also include a web browser and/or other applications that stream video and/or present resources.

A web browser can request a resource 145 from a web server that hosts a website 140 of a publisher 130, e.g., in response to the user of the client device 110 entering the resource address for the resource 145 in an address bar of the web browser or selecting a link that references the resource address. Similarly, a native application can request application content from a remote server of a publisher 130.

Some resources 145, application pages, or other application content can include digital component slots for presenting digital components with the resources 145 or application pages. As used throughout this document, the phrase "digital component" refers to a discrete unit of digital content or digital information (e.g., a video clip, audio clip, multimedia clip, image, text, or another unit of content). A digital component can electronically be stored in a physical memory device as a single file or in a collection of files, and digital components can take the form of video files, audio files, multimedia files, image files, or text files and include advertising information, such that an advertisement is a type of digital component. For example, the digital component may be content that is intended to supplement content of a web page or other resource presented by the application 112. More specifically, the digital component may include digital content that is relevant to the resource content (e.g., the digital component may relate to the same topic as the web page content, or to a related topic). The provision of digital components by the digital component distribution system 150 can thus supplement, and generally enhance, the web page or application content.

When the application 112 loads a resource 145 (or application content) that includes one or more digital component slots, the application 112 can send a request 120 (which can include an attestation token 122 as described below) for a digital component for each slot from the digital component distribution system 150. The digital component distribution system 150 can, in turn request digital components from digital component providers 160. The digital component providers 160 are entities that provide digital components for presentation with resources 145.

In some cases, the digital component distribution system 150 can also request digital components from one or more digital component partners 157. A digital component partner 157 is an entity that selects digital components 129 on behalf of digital component providers 160 in response to digital component requests.

The digital component distribution system 150 can select a digital component 129 for each digital component slot based on various criteria. For example, the digital component distribution system 150 can select, from the digital components received from the digital component providers 160 and/or the digital component partners 157, a digital component based on relatedness or relevance to the resource 145 (or application content), performance of the digital component (e.g., a rate at which users interact with the digital component), etc. The digital component distribution system 150 can then provide the selected digital component(s) 129 to the client device 110 for presentation with the resource 145 or other application content.

A client device 110 can also include a consent management module 114 that enables a user of the client device 110 to manage user consent settings that define whether and/or how the user's data is collected and used. The consent management module 114 can be implemented as a plug-in to the device platform 113, e.g., as a plug-in to the operating system of the client device 110. A plug-in is a software component that provides additional features to an application. In some implementations, the consent management module 114 can be implemented as a plug-in to a web browser or native application.

The consent management module 114 can run in a tightly controlled environment that isolates the consent management module 114 from other application and/or resources of the client device 110. For example, the consent management module 114 can run in a sandbox of the device platform 113. In this way, the consent management module 114 cannot communicate outside of the device platform 113 or interfere with the execution of other applications 112 on the same device.

The consent management module 114 enables the user to specify how user data, such as the user's activity on the client device, web browsing history, native applications downloaded or accessed, demographic information, location information, interests, and/or other personal data, is collected and used. In some implementations, the consent management module 114 enables the user to specify, for all recipients and/or each recipient individually, whether the recipient can store and/or access information on the client device 110, use user data to select digital components, use user data to create one or more user profiles, use user data to select personalized digital components (e.g., using the profile(s)), measure the performance of digital components or other content (e.g., based on whether the user interacts with the digital components or other content), and/or to generate audience insights.

The consent management module 114 can provide one or more consent management user interfaces 116 that enable the user to specify user consent settings. For example, a user interface can present, for each setting, a check box control that allows the user to consent to the setting or decline the setting. In a particular example, a setting may be to enable any user data to be transmitted from the client device 110. In this example, the user can select the check box for the setting (e.g., checked) or not select the check box (e.g., unchecked) to decline the setting.

In another example, the user interface 116 can enable the user to select from multiple options for a setting. For example, the user interface 116 can present, for each of a set of domain names (which can include websites of publishers, digital component providers 160, digital component distribution systems 150, and/or digital component partners 157) and/or native applications, multiple buttons that each define types of data that can be sent to the domain by the application. The user can consent to the type of data by selecting the button and rescind consent by deselecting the button.

The consent management module 114 can enable the user to specify user consent settings that define what data is transmitted from the client device 110, how that data can be used (e.g., to customize content of a web page or application, to select digital components, in encrypted or non-encrypted forms, over secure channels only), to what recipients the data can be sent, whether and for how long the user data can be stored, and/or other appropriate consents to the use of user data. The consent management module 114 can enable the user to specify settings for all recipients, e.g., overall settings, or per recipient. In this way, users have fine-tuned control over how their data is collected and used.

The consent management module 114 can store the user consent settings specified by the user in a consent storage unit 117. The consent storage unit 117 can be isolated and/or encrypted to prevent access or modification by other devices or applications.

The consent management module 114 can be used to manage the collection and use of user data by each web browser and native application on the client device 110. When the client device 110 is going to send a request 120 that includes user data, e.g., on behalf of a web browser or native application, the device platform 113 can query the consent management module 114 for the current user consent settings. The device platform 113 can then generate a request that only includes user data to the extent consented to by the user and defined by the current user consent settings. In this way, a single consent module 114 can prevent the transmission, from multiple applications, of user data to which the user has not consented. As such, each client device 110 may only have one consent management module 114 installed on the client device 110 and/or active at a given time on the client device 110, in some implementations.

In some cases, there may be multiple consent management providers that operate consent management provider systems 170 for managing user data in accordance with user consent settings. Each consent management provider can make a consent management module 114 available to users. In this example, each user can download or otherwise install their consent management module 114 from the consent management provider system 170 of their preferred consent management provider.

In some implementations, the consent management module 114 can enable the user to specify whether audio, video, and/or image data is collected, transmitted to, and/or used by others. For example, the consent management module 114 can enable the user to specify whether the client device 110 or another device, e.g., an assistant device (e.g., a smart speaker), another mobile device, etc. can collect, receive or use audio, video, or image data. In some implementations, the consent management module 114 can enable the user to specify whether sensor information (e.g., from a smart thermostat or Internet of Things (IoT) device) can be collected, transmitted, or used by others. In such examples, these devices can query the consent management module 114 to determine whether the data can be sent to another device in a similar manner as the device platform 113.

The consent management module 114 can also include standard settings, e.g., that are based on laws, regulations, or best practices that define whether user data can be collected and/or how the user data can be used. These standard settings can include whether the device platform 113 should send user data or requests to a recipient (e.g., a particular network domain), whether requests to a recipient should contain any user identifiers, whether a recipient could provide personalized content to the user, and/or other appropriate settings.

The consent management module 114 can, e.g., periodically, send queries 171 to the consent management provider system 170 for updates to the standard settings, logic used to implement the consent management module 114, and/or updates to a recommendation engine 115 (described below). In response, the consent management provider system 170 can provide updates 173 requested by the queries 171. In this way, the consent management module 114 on each client device 110 can be updated, in response to changes in user privacy laws, regulations, or best practices.

The recommendation engine 115 can recommend, to the user, user consent settings in the user interface(s) 116. The recommendation 115 can recommend user settings based on a variety of factors, including, for example, a current geographic location of the client device 110, the contribution of recipients to digital components presented at the client device 110, and/or user activity on the client device 110. This user activity can include, for example, web browsing history, location history, applications installed on the client device 110, and/or applications accessed by the user, e.g., during a given time period. For example, the recommendation engine 115 can recommend user consent settings that conform to local laws, regulations, or best practices based on the user's current geographic location as defined by a Global Positioning System (GPS) receiver of the client device 110, or based on the user's current geographic location inferred from the device's Internet Protocol (IP) address. In this way, a user that travels internationally can be provided recommended user consent settings appropriate for the current location.

As mentioned above, the recommendation engine 115 can use contributions of recipients to digital components presented at the client device 110. The consent management module 114 or another application (e.g., a web browser or native application) can determine a level of contribution of multiple domains to the presentation of digital components at the client device 110 over a given time period. For example, digital components can include metadata that indicates one or more domains that contributed to the delivery of the digital component. In a particular example, the metadata can indicate that a first domain contributed certain graphics in the digital component and a second domain contributed text in the digital component. The consent management module 114 or application can determine a level of contribution for each domain that contributed to at least one digital component being presented at the client device 110.

The level of contribution of a domain can be determined in various ways. For example, the level of contribution of a domain can be based on a quantity of digital components to which the domain contributed to being presented at the client device 110, a percentage of digital components that were interacted with on the client device 110 and to which the domain contributed, the types or sizes of digital components to which the domain contributed to being presented at the client device 110, and/or other appropriate factors.

The recommendation engine 115 can use the levels of contribution to recommend user consent settings to the user. For example, if a domain stores data on the client device 110 and/or receive user data from the client device 110 but does not contribute to digital components being presented at the client device 110, the recommendation engine 115 can recommend that the user block (e.g., do not consent to) the domain storing data on the client device 110 or receive user data from the client device 110 as it may not be known why the domain is collecting the user data.

The recommendation engine 115 can compare the level of contribution for a domain to a threshold. If the level of contribution does not satisfy the threshold (e.g., is less than the threshold), the recommendation engine 115 can recommend that the user not consent to the domain storing data on the client device 110 or receiving user data from the client device 110. If the level of contribution satisfies the threshold (e.g., meets or exceeds the threshold), the recommendation engine 115 can recommend that the user consent to the domain storing data on the client device 110 and/or receiving user data from the client device 110. The recommendation engine 115 can perform this recommendation process for each domain that contributed to at least one digital component being presented at the client device 110.

The user can view recommended user consent settings in the user interface(s) 116 and either confirm or reject the recommended user consent settings. For example, the user interface 116 can present a set of recommended user consent settings that cover multiple domains and/or multiple types of consents (e.g., storing data, transmitting data, etc.) and the user can simply accept or decline the recommended user consent settings. This can make it easier and more efficient for a user to specify user consent settings relative to customizing each type of setting and/or for each domain.

In some implementations, the device platform 113 sends user consent settings with requests 120 that include user data. Each recipient of the user data can be required to store the user consent settings, e.g., for auditing purposes. In this way, an auditor can audit the user data stored by a recipient and the user consent settings to ensure that the recipient is storing and using each user's data in accordance with the users' consent settings.

To prevent fraud by a recipient, the device platform 113 (or web browser or native application sending the request) can digitally sign at least the user consent settings using a private key maintained confidentially by the device platform 113 (or web browser or native application). An auditor can use a public key that corresponds to (e.g., that is mathematically linked to) the private key and the stored used consent settings to verify the signature. If the signature cannot be verified using the public key and the stored user consent settings, then the auditor can determine that the user consent settings have been altered.

In some implementations, the device platform 113 generates an attestation token 122 that is included in a request 120 or that implements the request 120. The attestation token is a token that can include the consent settings and a digital signature of the consent settings (using the private key) and other data such that any modification to the user consent settings after creation can be detected. For example, the attestation token can be a complex message that includes the consent settings and other data. The signed data can include a unique identifier for the user so that recipients of the attestation token can verify that the attestation token was sent from the user. The attestation token can also include an integrity token, e.g., a device integrity token and/or a browser integrity token, so that recipients can verify that the attestation token was received from a trusted device or trusted web browser.

The attestation token 120 can include data specifying the purpose or operation of the request (e.g., to change user consent settings or request a digital component), a user identifier that uniquely identifies the user (e.g., a public key of the client device 110), an attestation token creation time that that indicates a time at which the attestation token 122 was created, an integrity token (e.g., a device integrity token and/or a browser integrity token), and a digital signature of at least a portion of the other data of the attestation token 122.

The integrity token can be a device integrity token that enables an entity to determine whether a request 120 was sent by a trusted client device 110. For example, the device integrity token can be issued by a third-party device integrity system that evaluates fraud signals of client devices and assigns a level of trustworthiness to the client devices based on the evaluation. The device integrity token for a client device 110 can include a verdict that indicates the level of trustworthiness (or integrity) of the client device 110 at the time that the device integrity token was generated, a device integrity token creation time that indicates a time at which the device integrity token was generated, and a unique identifier for the client device 110 (e.g., the device public key 1136 of the client device or its derivative). The device integrity token can also include a digital signature of the data in the device integrity token using a private key of the device integrity system. For example, the device integrity system can sign the data using its private key, which the system maintains confidentially. The entities that receive the attestation token 122 can use a public key of the device integrity system to verify the signature of the device integrity token. As the integrity of a client device 110 can change over time, each client device 110 can request a new device integrity token periodically. The entities that receive the attestation token 122 can check the creation time of the device integrity token to identify stale device integrity tokens.

For requests sent on behalf of web browsers, the integrity token can be a browser integrity token that indicates the integrity of the web browser, or whether the user's interactions with websites are genuine. Examples of non-genuine user interactions include interactions initiated by bots, etc. rather than the user. A browser integrity token can be issued by a third-party browser integrity system based on fraud detection signals sent to the third browser integrity system. The fraud signals can include, for example, mouse movement speed, direction, intermission and other patterns, click patterns, etc.

Similar to the device integrity token, the browser integrity token for a web browser can include a verdict that indicates the level of trustworthiness (or integrity) of the web browser, or the level of genuineness of user interactions with websites, at the time that the browser integrity token was generated, a browser integrity token creation time that indicates a time at which the browser integrity token was generated, and a unique identifier for the client device 110 (e.g., the public key of the client device or web browser). The browser integrity token can also include a digital signature of the data in the browser integrity token using a private key of the browser integrity system. For example, the browser integrity system can digitally sign the data using its private key, which the system maintains confidentially. The entities that receive the attestation token 122 can use a public key of the browser integrity system to verify the signature of the browser integrity token. The client device 110 can store integrity tokens (e.g., a device integrity token and/or a browser integrity token) for inclusion in attestation tokens 122.

As described above, the client device 110 can request digital components from the digital component distribution system 150. Prior to an application (e.g., a web browser or native application) presenting a digital component, the application can ensure that the user has consented to the digital component being presented. A digital component can include data, e.g., metadata, that specifies the provider (e.g., the digital component distribution system 150, the digital component partner 157, and/or the digital component provider 160) and whether the digital component is a personalized digital component that is selected and/or customized based on the user's data (e.g., based on a user profile generated for the user).

Prior to rendering a digital component, the application (e.g., a web browser or native application) can query the consent management module 114 whether the provider has proper user consent to show personalized content to the user. For example, the application can provide, to the consent management module 114, the digital component or metadata fetched previously that specifies the provider and whether the digital component is personalized with the query. The consent management module 114 can determine, based on the current user consent settings and the received digital component or metadata, whether the user has consented to the digital component being presented. The consent management module 114 can then respond to the application with data specifying that the digital component can be presented or not presented. The application can then either present the digital component or block the digital component based on the response from the consent management module 114.

In some implementations, the consent management module 114 can also enable the user to view which domains has the user's data and what data each domain has. The consent management module 114 can also enable the user to request that a domain delete the user's data, to not transfer the user's data to another entity, to correct the user's data, and/or to export the user's data, e.g., to the client device 110.

Figure 2:
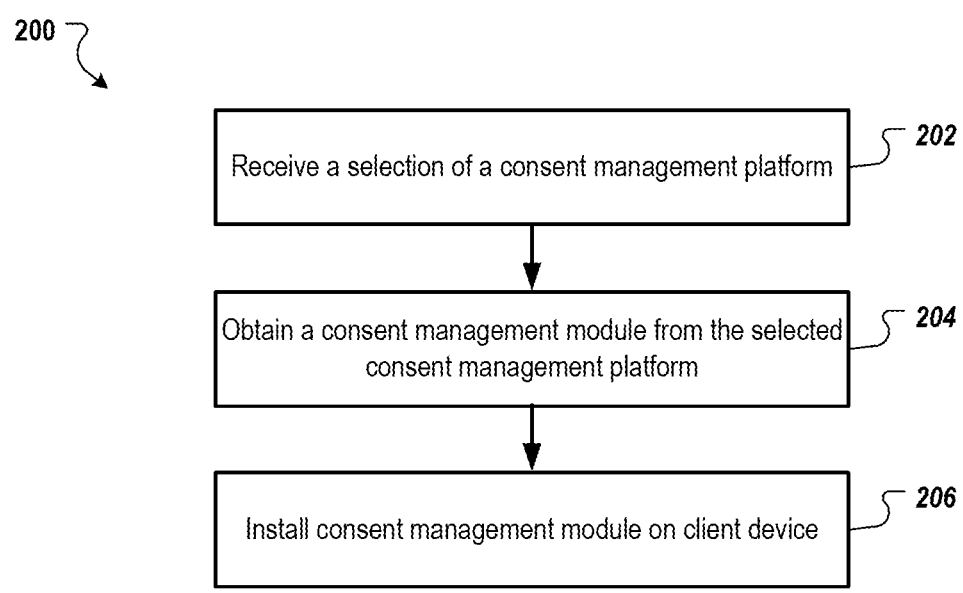
FIG. 2 is a flow diagram that illustrates an example process for installing a user-selected consent management module on a client device.

FIG. 2 is a flow diagram that illustrates an example process 200 for installing a user-selected consent management module on a client device. The process 200 can be implemented, for example, by a client device 110. Operations of the process 200 can also be implemented as instructions stored on non-transitory computer readable media, and execution of the instructions by one or more data processing apparatus can cause the one or more data processing apparatus to perform the operations of the process 200.

A selection of a consent management platform is received (202). An application (e.g., web browser or native application) or a device platform of a client device can present, to the user, a user interface that enables the user to select from multiple consent management platforms. Each consent management platform can provide ways for the user to manage user consent settings that control how the user's data is collected and used. For example, each consent management platform can provide a consent management module that enables the user to specify user consent settings at the client device and that manages the collection and use of the user's data at the client device and at other locations, e.g., at remote servers or other entities.

The user interface can be presented in response to a determination that an application is attempting to send user data from the client device to another entity and that a consent management module is not currently installed or active on the client device. The user can select a consent management platform from the user interface, or decline to select any consent management platform.

A consent management module is obtained from the selected consent management platform (204), or obtained from another location such as an application store where users can download applications and add-ons for applications. For example, an application store can ensure that the consent management module satisfies some minimum quality standards and is compliant with some policy. In response to a selection of the consent management platform, the client device can send a request to a consent management provider system of the selected consent management platform. In response, the system can send the consent management module (or an executable file for installing the consent management module) to the client device.

The consent management module is installed on the client device (206). As described above, the consent management module can be implemented in the form of a plug-in for an operating system. In this example, the operating system installs the plug-in. Installation of the consent management module can also include configuring applications to interact with the consent management module when sending requests and presenting digital components.

Figure 3:
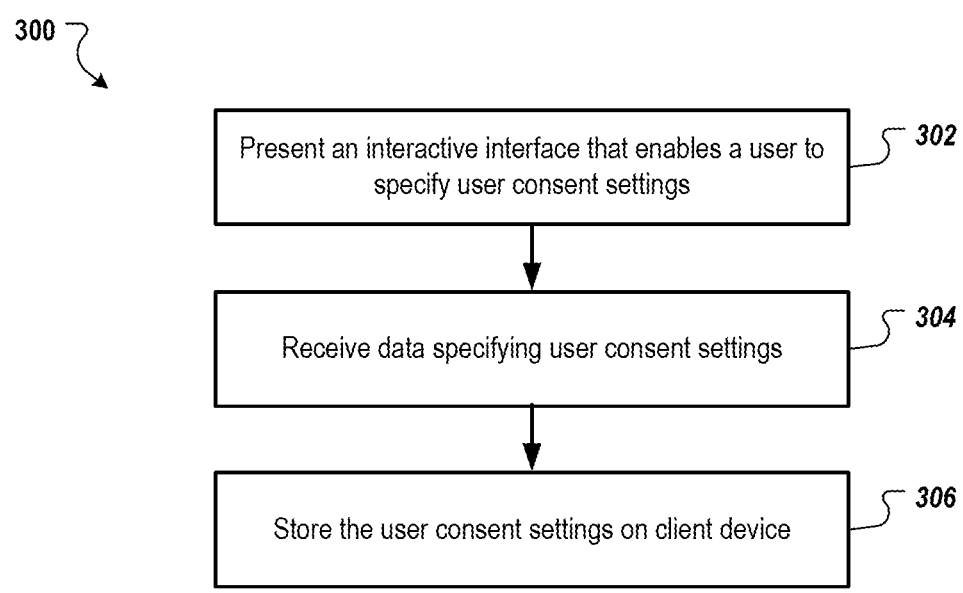
FIG. 3 is a flow diagram that illustrates an example process for enabling a user to specify user consent settings and storing the user consent settings.

FIG. 3 is a flow diagram that illustrates an example process 300 for enabling a user to specify user consent settings and storing the user consent settings. The process 300 can be implemented, for example, by a consent management module of a client device. Operations of the process 300 can also be implemented as instructions stored on non-transitory computer readable media, and execution of the instructions by one or more data processing apparatus can cause the one or more data processing apparatus to perform the operations of the process 300.

An interactive interface is presented (302). The interactive interface can enables a user to specify user consent settings that define, for example, what user data can be collected, who can receive the data, the data retention policy (e.g., auto-deletion after 30 days or another appropriate time period), and how the data can be used by each recipient. In some implementations, the interactive interface can include a set of user consent settings and, for each user consent setting, a user interface control that enables the user to consent to or decline consent. For example, the interactive interface can include a setting that globally controls whether any user data can be transmitted from the user device to any domain. The interactive interface can also include a check box control (or other type of control) that enables the user to consent to user data being transmitted or decline consent which would prevent any user data from being transmitted from the client device. The interactive interface can present similar user consent settings for other types of user consents, for each domain, and/or for each application installed on the client device. As described above, the interactive interface can also present recommended settings. A consent management module executing on the client device can generate recommended settings as well as present the interactive interface.

Data specifying the user consent settings is received (304). The user interface can pass the user consent settings specified by the user to the consent management module.

The user consent settings are stored on the client device (306). The consent management module can store the user consent settings in secured storage, e.g., within a sandbox of the device platform of the client device to prevent access from outside of the sandbox. In some implementations, with proper user consent, the consent management module can store the user consent settings in secured storage on the Internet managed by consent management platform. Such Internet storage may be beneficial for back/restore purposes, and for consistent user experience across multiple devices, if the user signs in from multiple devices.

Figure 4:
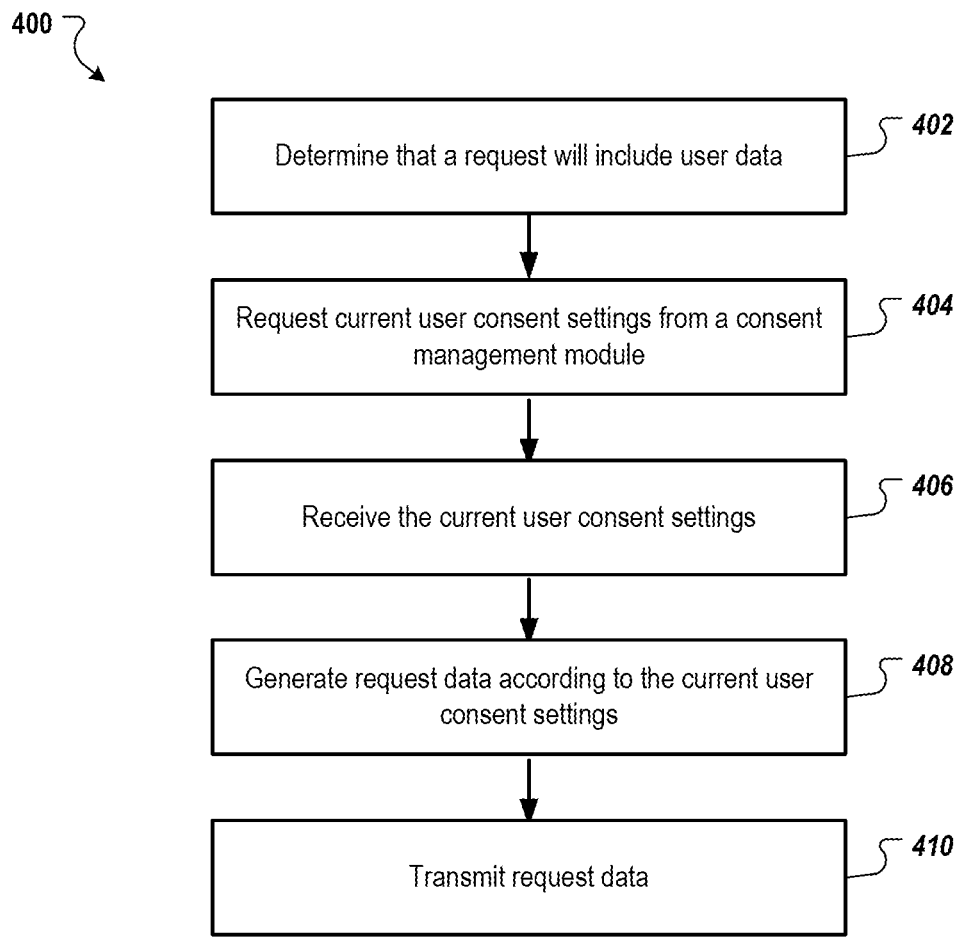
FIG. 4 is a flow diagram that illustrates an example process for transmitting requests according to user consent settings.

FIG. 4 is a flow diagram that illustrates an example process 400 for transmitting requests according to user consent settings. The process 400 can be implemented, for example, by a consent management module of a client device. Operations of the process 400 can also be implemented as instructions stored on non-transitory computer readable media, and execution of the instructions by one or more data processing apparatus can cause the one or more data processing apparatus to perform the operations of the process 400.

A determination is made that a request will include user data (402). For example, a device platform of a client device can transmit requests on behalf of applications, such as web browser and native applications. The applications can provide the data of the requests to the device platform and data indicating whether the requests include user data. In another example, the device platform can evaluate the data received from the applications and determine that the request will include user data. In another example, the browser or native applications will query the user consent settings prior to generating and sending a request.

For example, when a browser sends a HyperText Transfer Protocol (HTTP) request to a domain, if the domain has cookie in the browser cookie jar, and the cookie value has sufficient entropy to identify a user (e.g. beyond a simple boolean value), the browser will query the plug-in whether the domain has user consent to collect user data. If and only if the answer is "yes", the browser will insert the cookie into the HTTP header.

In another example, if the domain to which the browser will send the request is known to use passive fingerprinting (i.e., depending on IP address and browser user agent and other signals in the HTTP request) to track users, the browser will route the HTTP request through to the network and withhold the browser user agent, if the plug-in replied that the domain has no user consent to collect user data.

A request is made for current user consent settings (404). The device platform can submit a query to a consent management module for the user consent settings. The query can ask for, e.g., request, specific user consent settings, e.g., for a domain to which the request will be sent, or all of the user consent settings.

The current user consent settings are received (406). The consent management module can provide, in response to the query, the current user consent settings. These current user consent settings can include the user consent settings specified by the user and/or standard/default user consent settings of the consent management module. For example, the standard/default user consent settings can be settings that block certain user data from being transmitted based on the current location of the user indicating that the user is in a country that has regulations that do not allow that type of user data to be collected. If the query asks for specific user consent settings, the consent management module may only provide those user consent settings.

Request data is generated according to the current user consent settings (408). The device platform can use the user consent settings to identify portions of the user data that can be included in the request, if any, and portions of the user data that cannot be included in the request, if any. For example, the device platform can evaluate the user consent settings to determine if there are settings for the recipient of the request. If so, the device platform can use those user consent settings to identify the portions of user data that can be included in the request. If not, the consent management module can use the general user consent settings to identify the portions of user data that can be included in the request.

In a particular example, a user may consent to location data being sent to a particular digital component distribution system, but not web browsing history. In this example, the device platform can determine whether the request includes location data or web browsing history data. If the request includes web browsing history data, the device platform can remove the web browsing history data from the request. The device platform can include, in the request data that will be transmitted from the client device, the location data consented to be the user.

The request data can also include user consent settings. The request can include only the user consent settings that apply to the request, e.g., the user consent setting for the recipient of the request and/or any global user consent settings used to allow user data to be included in the request. In another example, the request can include user consent settings for the recipient and any user consent settings that apply to all recipients. As described above, a digital signature of at least the user consent settings can be generated and included in the request so that the user consent settings can be verified later, e.g., in an audit.

The request data is transmitted (410). The device platform can transmit the request data to the recipient of the request, e.g., to a digital component distribution system. As described above, the request can include or be in the form of an attestation token.

Further to the descriptions above, a user may be provided with controls allowing the user to make an election as to both if and when systems, programs, or features described herein may enable collection of user information (e.g., information about a user's social network, social actions, or activities, profession, a user's preferences, or a user's current location), and if the user is sent personalized content or communications from a server. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over what information is collected about the user, how that information is used, the information retention policy, and what information is provided to the user.

Figure 5:
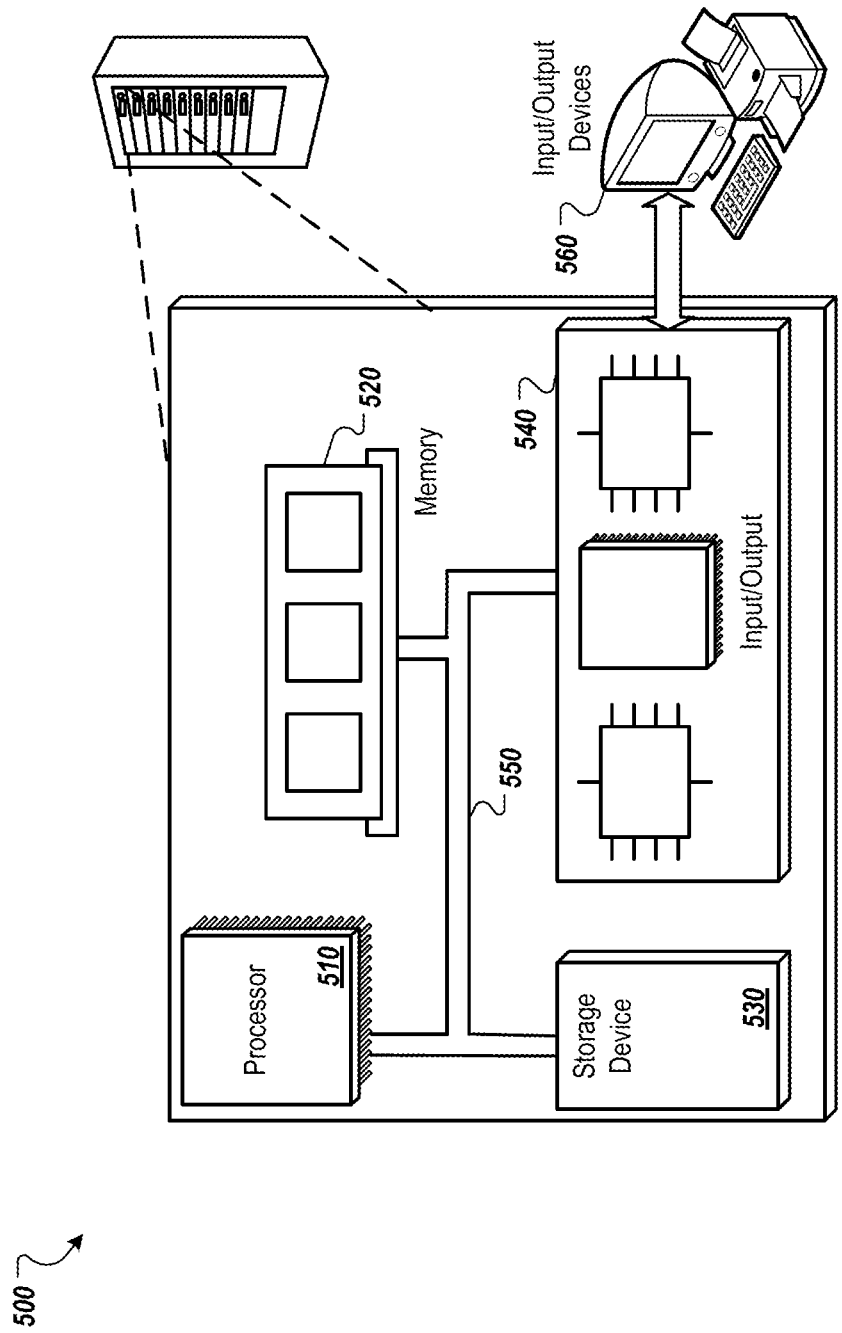
FIG. 5 is block diagram of an example computer system that can be used to perform operations described above.

FIG. 5 is block diagram of an example computer system 500 that can be used to perform operations described above. The system 500 includes a processor 510, a memory 520, a storage device 530, and an input/output device 540. Each of the components 510, 520, 530, and 540 can be interconnected, for example, using a system bus 550. The processor 510 is capable of processing instructions for execution within the system 500. In some implementations, the processor 510 is a single-threaded processor. In another implementation, the processor 510 is a multi-threaded processor. The processor 510 is capable of processing instructions stored in the memory 520 or on the storage device 530.

The memory 520 stores information within the system 500. In one implementation, the memory 520 is a computer-readable medium. In some implementations, the memory 520 is a volatile memory unit. In another implementation, the memory 520 is a non-volatile memory unit.

The storage device 530 is capable of providing mass storage for the system 500. In some implementations, the storage device 530 is a computer-readable medium. In various different implementations, the storage device 530 can include, for example, a hard disk device, an optical disk device, a storage device that is shared over a network by multiple computing devices (e.g., a cloud storage device), or some other large capacity storage device.

The input/output device 540 provides input/output operations for the system 500. In some implementations, the input/output device 540 can include one or more of a network interface devices, e.g., an Ethernet card, a serial communication device, e.g., and RS-232 port, and/or a wireless interface device, e.g., and 802.11 card. In another implementation, the input/output device can include driver devices configured to receive input data and send output data to other input/output devices, e.g., keyboard, printer and display devices 560. Other implementations, however, can also be used, such as mobile computing devices, mobile communication devices, set-top box television client devices, etc.

Although an example processing system has been described in FIG. 5, implementations of the subject matter and the functional operations described in this specification can be implemented in other types of digital electronic circuitry, or in computer software, firmware, or hardware, including the structures disclosed in this specification and their structural equivalents, or in combinations of one or more of them.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage media (or medium) for execution by, or to control the operation of, data processing apparatus. Alternatively, or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an internetwork (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

The invention claimed is:

1. A computer-implement method comprising:
   determining that a request for transmission by a client device to a recipient will include user data of a user of the client device;
   in response determining that the request will include the user data:
      requesting, from a consent management module of the client device, current user consent settings specified by the user, wherein the user consent settings define at least one of (i) user data that can be transmitted from the client device, (ii) how user data transmitted from the client device can be used or (iii) which recipients can receive and retain user data from the client device;
      receiving, from the consent management module, the current user consent settings;
      generating request data according the current user consent settings, the generating comprising:
         including, in the request data, one or more portions of the user data of the user to which the user has consented to being transmitted to the recipient; and
         including, in the request data, at least a portion of the user consent settings that specify the consents given to the recipient of the one or more portions of the user data, wherein the consents restrict use of the one or more portions of the user data by the recipient; and
      generating, using a private key of a computing platform of the client device, a digital signature of the portion of the user consent settings that specify the consents given to the recipient for using the one or more portions of the user data; and
   generating and transmitting, to the recipient, an attestation token that includes at least the request data, user consent data, and the digital signature.

2. The method of claim 1, further comprising providing, to a third party, a public key that corresponds to the private key of the computing platform of the client device, wherein the public key enables the third party to verify the user consent data.

3. The method of claim 1, further comprising:
   receiving selection data specifying a selection, from multiple consent management platforms, of a given consent management platform;
   obtaining, from the given consent management platform or an application store, the consent management module; and
   installing, on the client device, the consent management module on the client device.

4. The method of claim 1, further comprising:
presenting an interactive interface that enables the user to specify the user consent settings and review current user consent settings;
receiving data specifying the user consent settings; and
storing the user consent settings at the client device.

5. The method of claim 4, further comprising presenting, in the interactive interface, one or more recommended user consent settings.

6. The method of claim 5, further comprising selecting the one or more recommended user consent settings based at least on a current location of the client device or user activity on the client device.

7. The method of claim 1, wherein the consent management module comprises a user-consent plug-in of the computing platform of the client device.

8. The method of claim 1, wherein the consent management module comprises a user consent plug-in of an operating system of the client device.

9. The method of claim 1, wherein the consent management module comprises a user consent plug-in of a web browser of the client device.

10. The method of claim 1, further comprising:
receiving a digital component for presentation at the client device;
determining that the digital component is a personalized digital component selected based on one or more portions of user data of the user;
in response to determining that the digital component is a personalized digital component selected based on one or more portions of user data of the user:
  determining whether the current user consent settings permit presentation of personalized digital components provided by a digital component distribution system that provided the personalized digital component; and
  in response to determining that the current user consent settings do not permit presentation of personalized digital components provided by a digital component distribution system, blocking presentation of the personalized digital component by the client device.

11. One or more non-transitory computer-readable media comprising instructions which, when executed by one or more processors, cause the one or more processors to perform operations comprising:
determining that a request for transmission by a client device to a recipient will include user data of a user of the client device;
in response determining that the request will include the user data:
  requesting, from a consent management module of the client device, current user consent settings specified by the user, wherein the user consent settings define at least one of (i) user data that can be transmitted from the client device, (ii) how user data transmitted from the client device can be used or (iii) which recipients can receive and retain user data from the client device;
  receiving, from the consent management module, the current user consent settings;
  generating request data according the current user consent settings, the generating comprising:
    including, in the request data, one or more portions of the user data of the user to which the user has consented to being transmitted to the recipient; and
    including, in the request data, at least a portion of the user consent settings that specify the consents given to the recipient of the one or more portions of the user data, wherein the consents restrict use of the one or more portions of the user data by the recipient; and
  generating, using a private key of a computing platform of the client device, a digital signature of the portion of the user consent settings that specify the consents given to the recipient for using the one or more portions of the user data; and
generating and transmitting, to the recipient, an attestation token that includes at least the request data, user consent data, and the digital signature.

12. A system comprising:
one or more processors; and
one or more storage media comprising instructions that, when executed by the one or more processors, cause the one or more processors to perform operations comprising:
  determining that a request for transmission by a client device to a recipient will include user data of a user of the client device;
  in response determining that the request will include the user data:
    requesting, from a consent management module of the client device, current user consent settings specified by the user, wherein the user consent settings define at least one of (i) user data that can be transmitted from the client device, (ii) how user data transmitted from the client device can be used or (iii) which recipients can receive and retain user data from the client device;
    receiving, from the consent management module, the current user consent settings;
    generating request data according the current user consent settings, the generating comprising:
      including, in the request data, one or more portions of the user data of the user to which the user has consented to being transmitted to the recipient; and
      including, in the request data, at least a portion of the user consent settings that specify the consents given to the recipient of the one or more portions of the user data, wherein the consents restrict use of the one or more portions of the user data by the recipient; and
    generating, using a private key of a computing platform of the client device, a digital signature of the portion of the user consent settings that specify the consents given to the recipient for using the one or more portions of the user data; and
  generating and transmitting, to the recipient, an attestation token that includes at least the request data, user consent data, and the digital signature.

13. The system of claim 12, wherein the operations comprise providing, to a third party, a public key that corresponds to the private key of the computing platform of the client device, wherein the public key enables the third party to verify the user consent data.

14. The system of claim 12, wherein the operations comprise:
receiving selection data specifying a selection, from multiple consent management platforms, of a given consent management platform;

obtaining, from the given consent management platform or an application store, the consent management module; and installing, on the client device, the consent management module on the client device.

15. The system of claim 12, wherein the operations comprise:

presenting an interactive interface that enables the user to specify the user consent settings and review current user consent settings;

receiving data specifying the user consent settings; and storing the user consent settings at the client device.

16. The system of claim 15, wherein the operations comprise presenting, in the interactive interface, one or more recommended user consent settings.

17. The system of claim 16, wherein the operations comprise selecting the one or more recommended user consent settings based at least on a current location of the client device or user activity on the client device.

18. The system of claim 12, wherein the consent management module comprises a user-consent plug-in of the computing platform of the client device.

19. The system of claim 12, wherein the consent management module comprises a user consent plug-in of a web browser of the client device.

20. The system of claim 12, wherein the operations comprise:

receiving a digital component for presentation at the client device;

determining that the digital component is a personalized digital component selected based on one or more portions of user data of the user;

in response to determining that the digital component is a personalized digital component selected based on one or more portions of user data of the user:

determining whether the current user consent settings permit presentation of personalized digital components provided by a digital component distribution system that provided the personalized digital component; and in response to determining that the current user consent settings do not permit presentation of personalized digital components provided by a digital component distribution system, blocking presentation of the personalized digital component by the client device.

* * * * *